US009181848B2

(12) United States Patent
Smith et al.

(10) Patent No.: US 9,181,848 B2
(45) Date of Patent: Nov. 10, 2015

(54) TURBOCHARGER EXHAUST MANIFOLD SYSTEM

(71) Applicant: Cummins, Inc., Columbus, IN (US)

(72) Inventors: Kevin Smith, Spanish Fork, UT (US); Salvatore C. Licata, Columbus, IN (US); Alexander C. Kopache, Columbus, IN (US); J. Richard Garvin, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 14/188,489

(22) Filed: Feb. 24, 2014

(65) Prior Publication Data
US 2015/0240697 A1 Aug. 27, 2015

(51) Int. Cl.
| | |
|---|---|
| *F01N 1/00* | (2006.01) |
| *F02B 33/44* | (2006.01) |
| *F01N 13/18* | (2010.01) |
| *F01D 25/28* | (2006.01) |
| *F01N 13/10* | (2010.01) |

(Continued)

(52) U.S. Cl.
CPC .......... *F01N 13/1805* (2013.01); *F01D 25/285* (2013.01); *F01N 13/10* (2013.01); *F01N 13/1855* (2013.01); *F02B 37/00* (2013.01); *F02B 67/10* (2013.01); *F01N 2450/18* (2013.01); *F01N 2450/26* (2013.01); *Y02T 10/144* (2013.01); *Y10T 29/49236* (2015.01)

(58) Field of Classification Search
CPC ............ F01N 13/1805; F01N 2450/18; F01N 2450/26; F01D 25/243; F01D 25/285; Y02T 10/144

USPC .......................................... 60/323, 598, 605.1
See application file for complete search history.

(56) References Cited

U.S. PATENT DOCUMENTS

| | | | | |
|---|---|---|---|---|
| 5,406,795 A | * | 4/1995 | Raub et al. ................... 60/605.1 |
| 5,741,084 A | * | 4/1998 | Del Rio et al. ................ 403/349 |
| 5,934,070 A | * | 8/1999 | Lagelstorfer ................... 60/280 |

(Continued)

FOREIGN PATENT DOCUMENTS

| | | | | |
|---|---|---|---|---|
| DE | 102008010629 A1 | * | 9/2009 | ............ F16L 23/032 |
| FR | 2897893 | | 8/2007 | |

(Continued)

OTHER PUBLICATIONS

The Search Report of the United Kingdom Intellectual Property Office issued in GB1501149.7, dated Jul. 1, 2015.

*Primary Examiner* — Audrey K Bradley
(74) *Attorney, Agent, or Firm* — Foley & Lardner LLP

(57) ABSTRACT

An engine subassembly and method of assembling an engine subassembly. The engine subassembly includes an exhaust manifold including an exit conduit. The exit conduit includes a first flange disposed about a peripheral portion of the exit conduit. The engine subassembly also includes a turbo charger including an entry conduit. The entry conduit further includes a second flange disposed about a peripheral portion of the entry conduit. The turbocharger engaged with the exhaust manifold such that the first flange is engaged with the second flange. The engine subassembly also includes an extension protruding axially from one of the entry conduit and the exit conduit. The extension includes at least one protrusion extending at least in part in a radial direction from the extension. The protrusion is configured for engagement with a channel formed in a wall of the other one of the entry conduit and the exit conduit.

33 Claims, 9 Drawing Sheets

(51) Int. Cl.
*F02B 37/00* (2006.01)
*F02B 67/10* (2006.01)

(56) References Cited

U.S. PATENT DOCUMENTS 6,260,888 B1 * 7/2001 McLaughlin ................. 285/261
6,688,103 B2 2/2004 Pleuss et al.
7,832,776 B2 11/2010 Cassel et al.
2003/0005694 A1 1/2003 Pleuss et al.
2007/0257487 A1 * 11/2007 Jacklich et al. ............... 285/401

FOREIGN PATENT DOCUMENTS

| GB | 1 315 634 | | 5/1973 | |
|---|---|---|---|---|
| GB | 2 478 007 | | 8/2011 | |
| JP | 07239069 A | * | 9/1995 | ............ F16L 23/026 |

* cited by examiner

TURBOCHARGER EXHAUST MANIFOLD SYSTEM

TECHNICAL FIELD

This disclosure relates to a manifold system for a turbocharged internal combustion engine.

BACKGROUND

In a turbocharged engine, the turbocharger is generally coupled to the exhaust manifold. There are various advantages that result from tightly packaging the turbo charger to the exhaust manifold. However, minimal clearances associated with tightly packaging the turbocharger to the exhaust manifold in an engine bay make coupling the turbocharger to the exhaust manifold by coupling components such as bolts increasingly challenging during assembly and for removing and or replacing the turbocharger for service, maintenance or repair. More specifically, the tight clearances are difficult to access with tools configured to tighten couplers such as bolt positioned about the turbocharger, which results in additional challenges related to achieving the proper torque on the bolts.

SUMMARY

Various embodiments provide exhaust manifolds and methods of coupling a turbocharger to an exhaust manifold.

In particular embodiments, an engine subassembly is provided. The engine subassembly includes an exhaust manifold including an exit conduit. The exit conduit includes a first flange disposed about a peripheral portion of the exit conduit. The engine subassembly also includes a turbo charger including an entry conduit. The entry conduit includes a channel formed in a wall of the entry conduit. The entry conduit further includes a second flange disposed about a peripheral portion of the entry conduit. The turbocharger is engaged with the exhaust manifold such that the first flange is engaged with the second flange. The engine subassembly also includes an extension protruding axially from the exit conduit. The extension includes at least one protrusion extending at least in part in a radial direction from the extension. The protrusion is configured for engagement with the channel.

In particular embodiments, the at least one protrusion includes a pin. In particular embodiments, the engine subassembly also includes a v-band positioned about the first flange and the second flange. The engine subassembly includes a first alignment indicator on the exhaust manifold corresponding to a position of the pin and a second alignment indicator on the turbocharger corresponding to an entry point of the channel. In particular embodiments, the engine subassembly further includes a third alignment indicator corresponding to a terminus point of the channel. The channel extends in a longitudinal direction in the entry conduit and in a circumferential direction within the entry conduit, such that the pin engages the channel via axial and rotational movement of the pin with respect to the entry conduit, in accordance with particular embodiments. In particular embodiments, the channel is helical. The engine subassembly may include a gasket positioned between the first flange and the second flange. The engine subassembly may include an annular O-ring channel disposed in the second flange in particular embodiments and may include an O-ring positioned in the O-ring channel.

Other various embodiments provide a method of assembling an engine subassembly. The method includes engaging a first flange positioned about a peripheral portion of an exit conduit of an exhaust manifold having a plurality of conduits converging into the exit conduit with a second flange of positioned about a peripheral portion of an entry conduit of a turbo charger such that a protrusion extending, at least in part, radially outward from an extension coupled to and extending from one of the exhaust manifold and the turbocharger, and extending into the other one of the exhaust manifold and the turbocharger. The extension includes at least one protrusion extending at least in part in a radial direction from the extension. The protrusion is configured for engagement with a channel formed in a wall of the other one of the exhaust manifold and the turbocharger. The method further includes rotating the turbocharger with respect to the exhaust manifold, such that the pin moves through the channel.

In particular embodiments, the protrusion includes a pin. In particular embodiments, the method also includes fastening a v-band to the turbocharger and the exhaust manifold about the first flange and the second flange. The method includes aligning a first alignment indicator on the exhaust manifold with a second alignment indicator on the turbocharger. The first alignment indicator corresponds to a position of one of the pin and an entry point of the channel and the second alignment indicator corresponding to the other one of the pin and an entry point of the channel. In particular embodiments, the method may also include rotating the turbocharger with respect to the exhaust manifold until one of the first alignment indicator and the second alignment indicator aligns with a third alignment indicator corresponding to a terminus point of the channel. In particular embodiments, the channel extends in a longitudinal direction in the entry conduit and in a circumferential direction within the entry conduit such that the pin engages the channel via axial and rotational movement of the pin with respect to the entry conduit. The channel is helical in accordance with particular embodiments. The method may include positioning a gasket between the first flange and the second flange. In particular embodiments, one of the first flange and the second flange includes an annular O-ring channel, and the O-ring may be positioned in the annular O-ring channel.

Other various embodiments provide an engine subassembly. The engine subassembly includes an exhaust manifold including an exit conduit having a first flange disposed about a peripheral portion of the exit conduit. The engine subassembly also includes a turbocharger including an entry conduit including a second flange disposed about a peripheral portion of the entry conduit. The turbocharger may be engaged with the exhaust manifold such that the first flange is engaged with the second flange. The engine subassembly may further include an extension coupled to and extending from one of the exhaust manifold and the turbocharger, and extending into the other one of the exhaust manifold and the turbocharger. The extension includes at least one pin extending at least in part in a radial direction from the extension. The pin is configured for engagement with a channel formed in a wall of the other one of the exhaust manifold and the turbocharger.

In particular embodiments, the engine subassembly also includes a v-band positioned about the first flange and the second flange. In particular embodiments, the extension is coupled to and extends from the exhaust manifold and the channel is formed in a wall of the turbocharger. In particular embodiments, the extension is coupled to and extends from the turbocharger and the channel is formed in a wall of the exhaust manifold.

The inventors have appreciated that a turbocharger may be tightly coupled to an exhaust manifold using a fastener such as a v-band. However, use of such a fastener presents challenges related to the assembly and disassembly of the turbocharger to and from the exhaust manifold. Accordingly, the inventors have further appreciated that the implementation and use of various embodiments disclosed herein may result in beneficial turbocharging connecting systems and methods that increase serviceability, ease of assembly, and provide a secure and reliable connection. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, and methods of coupling a turbocharger to an exhaust manifold. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
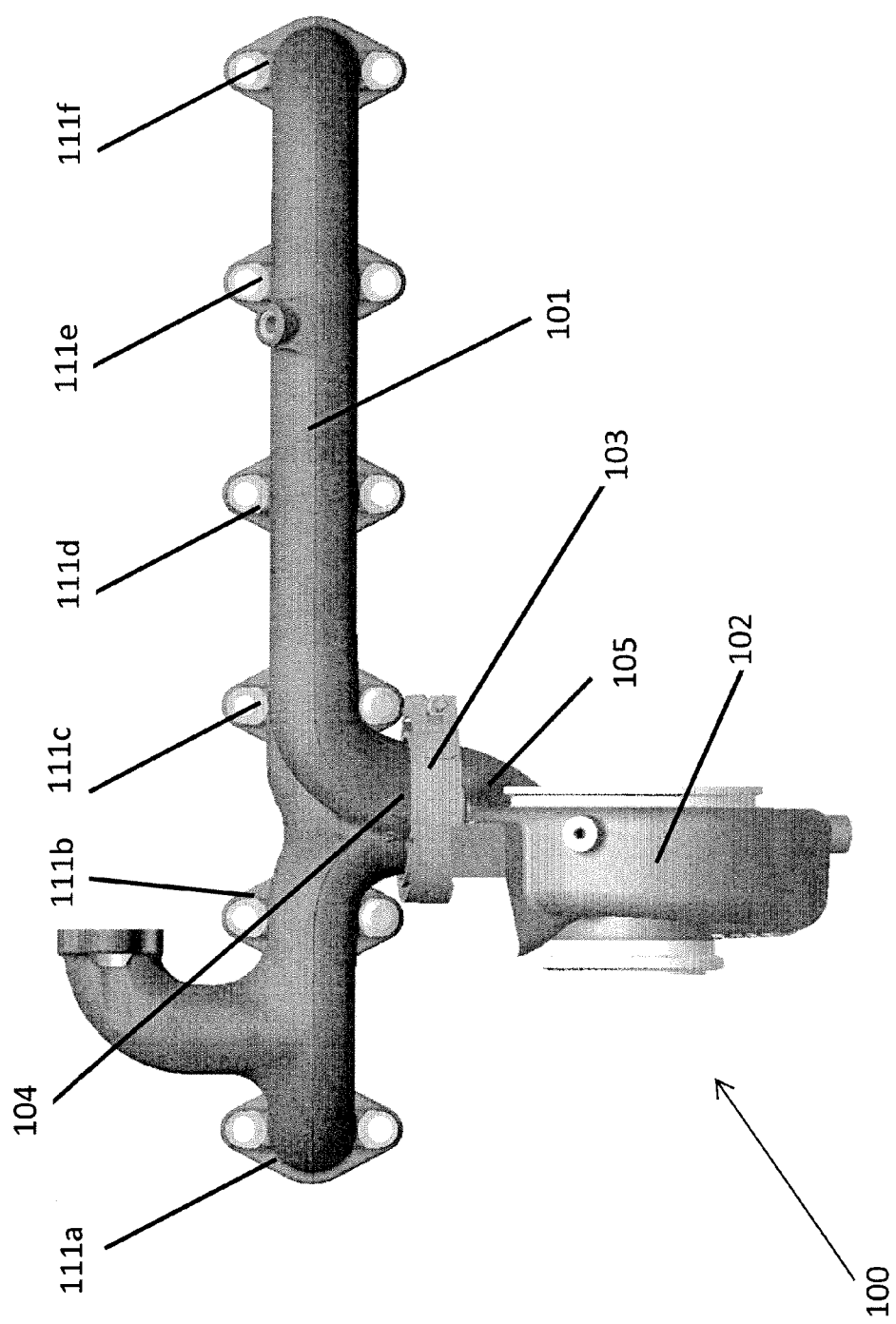
FIG. 1 shows an engine subassembly including a turbocharger coupled to an exhaust manifold in accordance with exemplary embodiments.

FIG. 1 shows an engine subassembly including a turbocharger coupled to an exhaust manifold in accordance with exemplary embodiments. The engine subassembly 100 includes an exhaust manifold 101 coupled to a turbocharger 102. The engine subassembly 100 may be an assembly for an engine including, but not limited to, a turbocharged diesel engine. The exhaust manifold 101 includes a plurality of conduits, such as conduits extending from ports at each of flanges 111a-111f, that converge into a conduit 104 for directing the exhaust fluid from a plurality of engine cylinders into a component such as the turbocharger 102. The turbocharger 102 is connected to the conduit 104 of the exhaust manifold 101 at an entry conduit 105 of the turbocharger 102. As demonstrated in the illustrative embodiments shown in FIG. 1, the exhaust manifold 101 may be coupled to the turbocharger 102 via a coupling mechanism, such as v-band 103.

Figure 2:
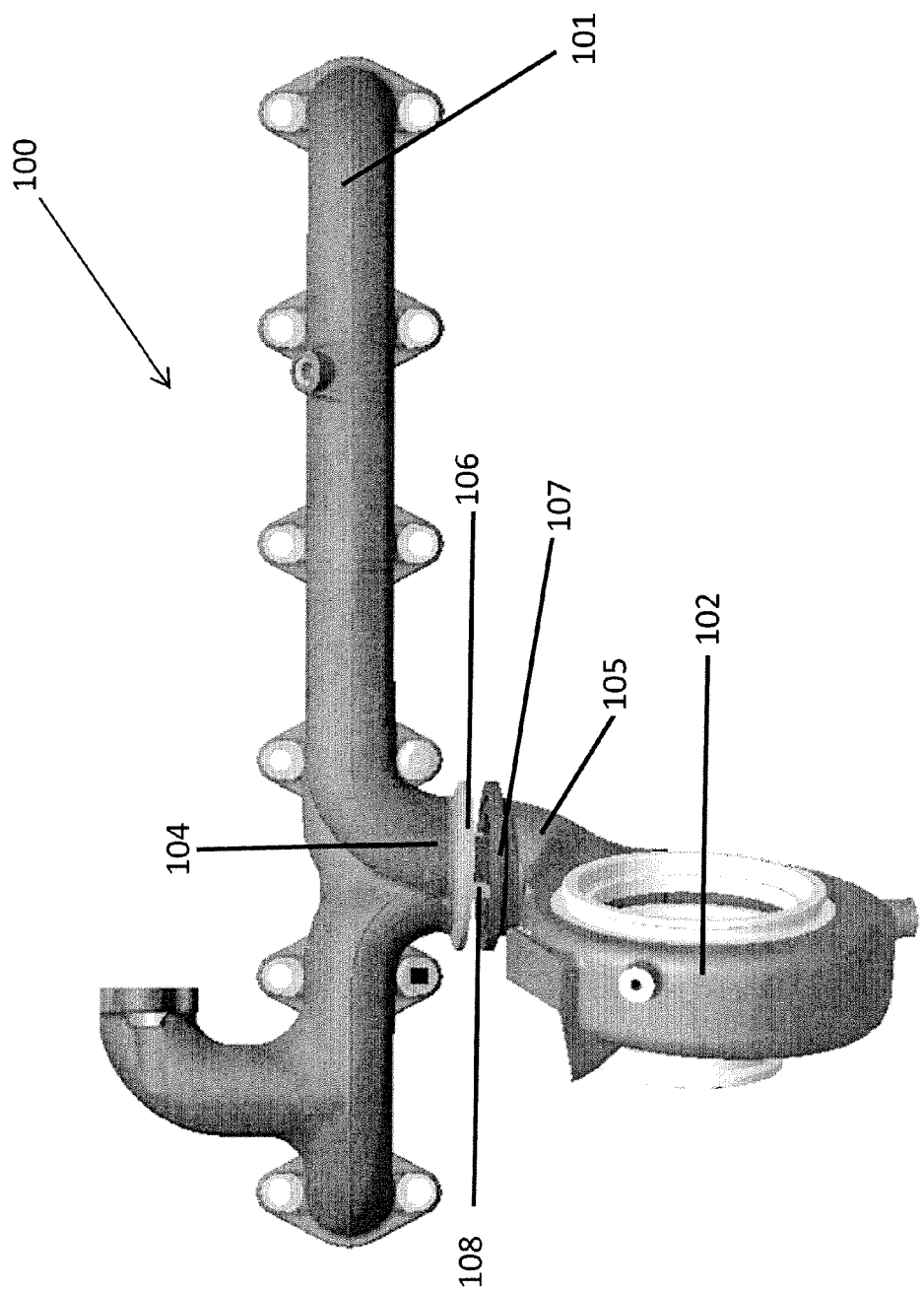
FIG. 2 illustrates the engine subassembly of FIG. 1 with the turbocharger partially disconnected from the exhaust manifold.

FIG. 2 illustrates the engine subassembly of FIG. 1 with the turbocharger partially disconnected from the exhaust manifold. The v-band 103 of the engine subassembly 100 is removed in FIG. 2, and the turbocharger 102 is spaced apart from the exhaust manifold 101. More specifically, an entry conduit flange 107 of the turbocharger 102 is spaced apart from an exhaust manifold outlet flange 106 of the exhaust manifold 101. The separation demonstrates the subassembly 100 being assembled or disassembled in accordance with exemplary embodiments. As shown in FIG. 2, the exhaust manifold 101 includes an extension 108 protruding from the conduit 104 and the entry conduit flange 107. As discussed further herein, the extension 108 facilitates engagement of the turbocharger 102 with the exhaust manifold 101.

Figure 3:
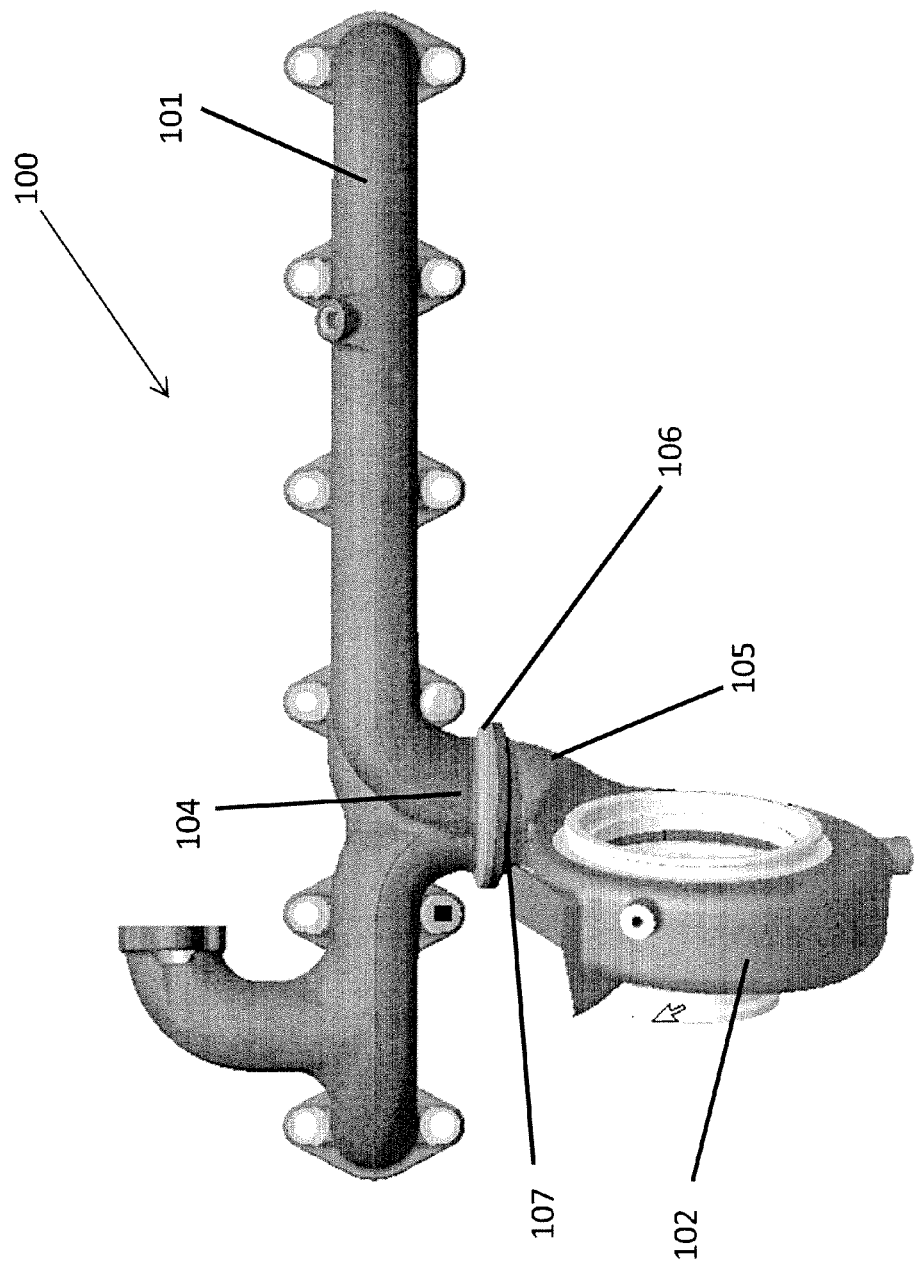
FIG. 3 illustrates the engine subassembly of FIG. 1 with the turbocharger adjacent to the exhaust manifold without the fastener.

FIG. 3 illustrates the engine subassembly of FIG. 1 with the turbocharger adjacent to the exhaust manifold without the fastener. The v-band 103 is removed (or not yet added to) from the engine subassembly 100 in FIG. 3. The entry conduit flange 107 and the exhaust manifold outlet flange 106 are engaged with one another, such that the extension 108 (no longer visible) protrudes from the conduit 104 of the exhaust manifold 101 into the entry conduit 105 of the turbocharger 102.

Figure 4:
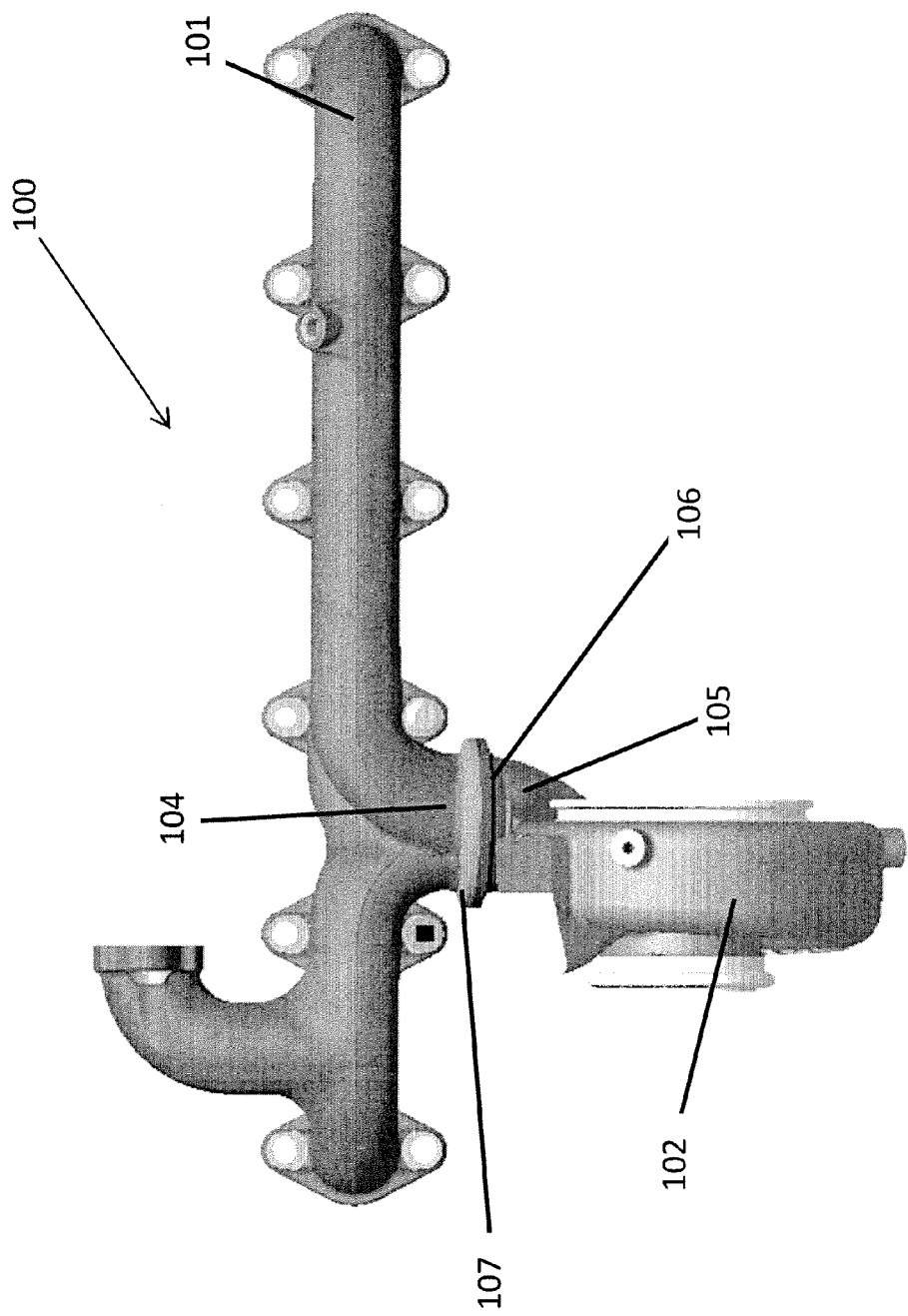
FIG. 4 shows the engine subassembly with the turbocharger adjacent to the exhaust manifold without the fastener and with the turbocharger rotated from the position illustrated in FIG. 3, in accordance with exemplary embodiments.

FIG. 4 shows the engine subassembly with the turbocharger adjacent to the exhaust manifold without the fastener and with the turbocharger rotated from the position illustrated in FIG. 3, in accordance with exemplary embodiments. During assembly or disassembly of the engine subassembly 100, the turbocharger 102 is rotated with respect to the exhaust manifold 101 as a part of the engagement and disengagement of the turbocharger 102 with the exhaust manifold 101 via the extension 108.

Figure 5:
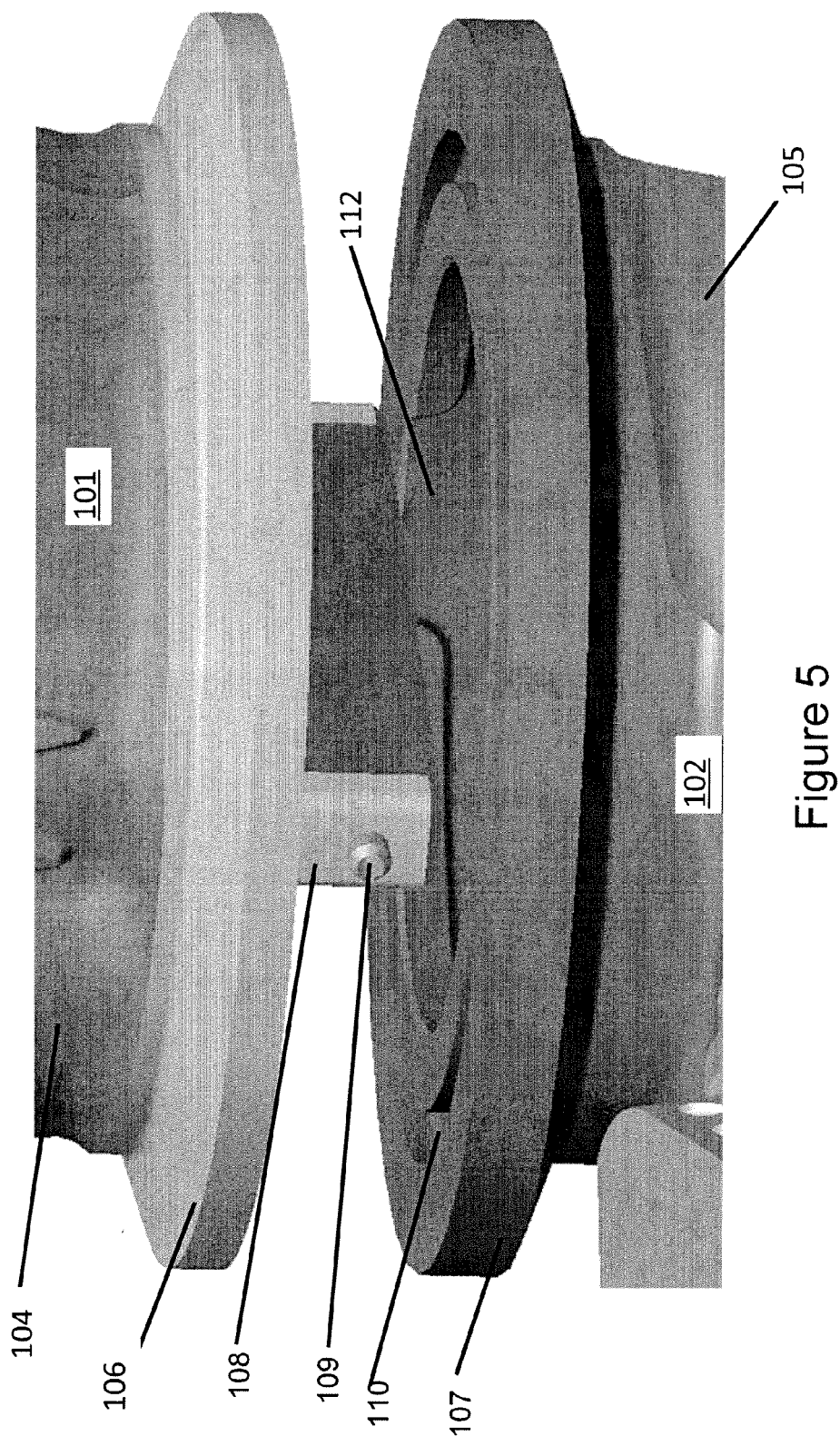
FIG. 5 provides a magnified view of the exhaust manifold of FIG. 1 in accordance with exemplary embodiments.

FIG. 5 provides a magnified view of the exhaust manifold of FIG. 1 in accordance with exemplary embodiments. As demonstrated in FIG. 5, the extension 108 may include a further protrusion such as pin 109. In particular embodiments, the protrusion may include a ball configured for engagement with a detent. The pin 109 is configured to engage with a channel 112 formed in the entry conduit 105 of the turbocharger 102. The extension 108 may include a pin, such as the pin 109 extending on opposites sides of the extension 108. While the extension 108 is illustrated as extending across the exit port within the exhaust manifold outlet flange 106 of the conduit 104, in accordance with various embodiments, the extension 108 may extend only partially across the exit port. Additionally, the extension 108 and the pin 109 may be positioned on the turbocharger side in various embodiments, and the exhaust manifold may have a channel such as channel 112. The turbocharger 102 may also include a groove or channel, such as groove 110, positioned in the entry conduit flange 107 of the turbocharger 102. The groove 110 is configured for holding a gasket or other similar sealing member such as an O-ring to create a seal between the exhaust manifold outlet flange 106 and the entry conduit flange 107 and prevent exhaust gas leakage as the exhaust gas is transmitted from the exhaust manifold 101 to the turbocharger 102.

Figure 6:
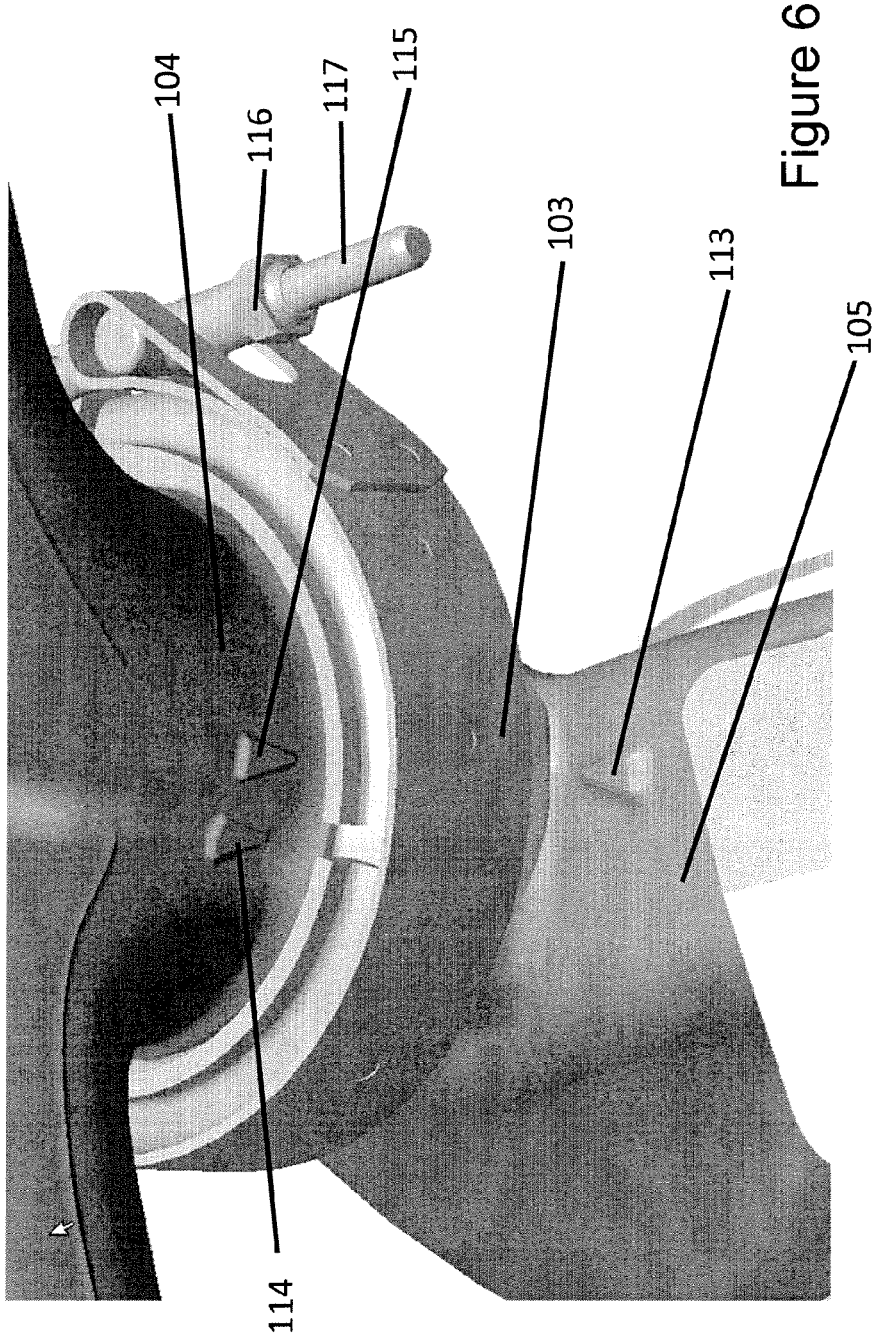
FIG. 6 shows a magnified perspective view of the engine subassembly of FIG. 1 in accordance with exemplary embodiments.

FIG. 6 shows a magnified perspective view of the engine subassembly of FIG. 1 in accordance with exemplary embodiments. As shown in FIG. 6, the exhaust manifold 101 and the turbocharger 102 may include one or more alignment indicators for guiding orientation of the turbocharger 102 with respect the exhaust manifold 101. In the illustrated embodiment, the turbocharger 101 includes an alignment indicator 113 on an outer wall of entry conduit 105 and the exhaust manifold includes an alignment indicator 114 on the outer wall of conduit 104. The alignment indicator 114 shows an installer where to initially line the turbocharger up for engagement of the extension 108 and the pin 109 with the channel 112. In the illustrated embodiment, the exhaust manifold 101 includes a second alignment indicator 115 that shows an installer how far to rotate the turbocharger 102 with respect to the exhaust manifold 101 such that pin 109 is in the final orientation with respect to the channel 112. Once the turbocharger 102 is in the final orientation with respect to the exhaust manifold 101, a fastener such as the v-band 103 may be secured about the exhaust manifold outlet flange 106 and the entry conduit flange 107, to tightly maintain the turbocharger 102 sealingly engaged with the exhaust manifold 101. The v-band allows the final fastening to be achieved via a single fastener tightened at a single location, for example via tightening of bolt 116 along bolt 117.

Figure 7:
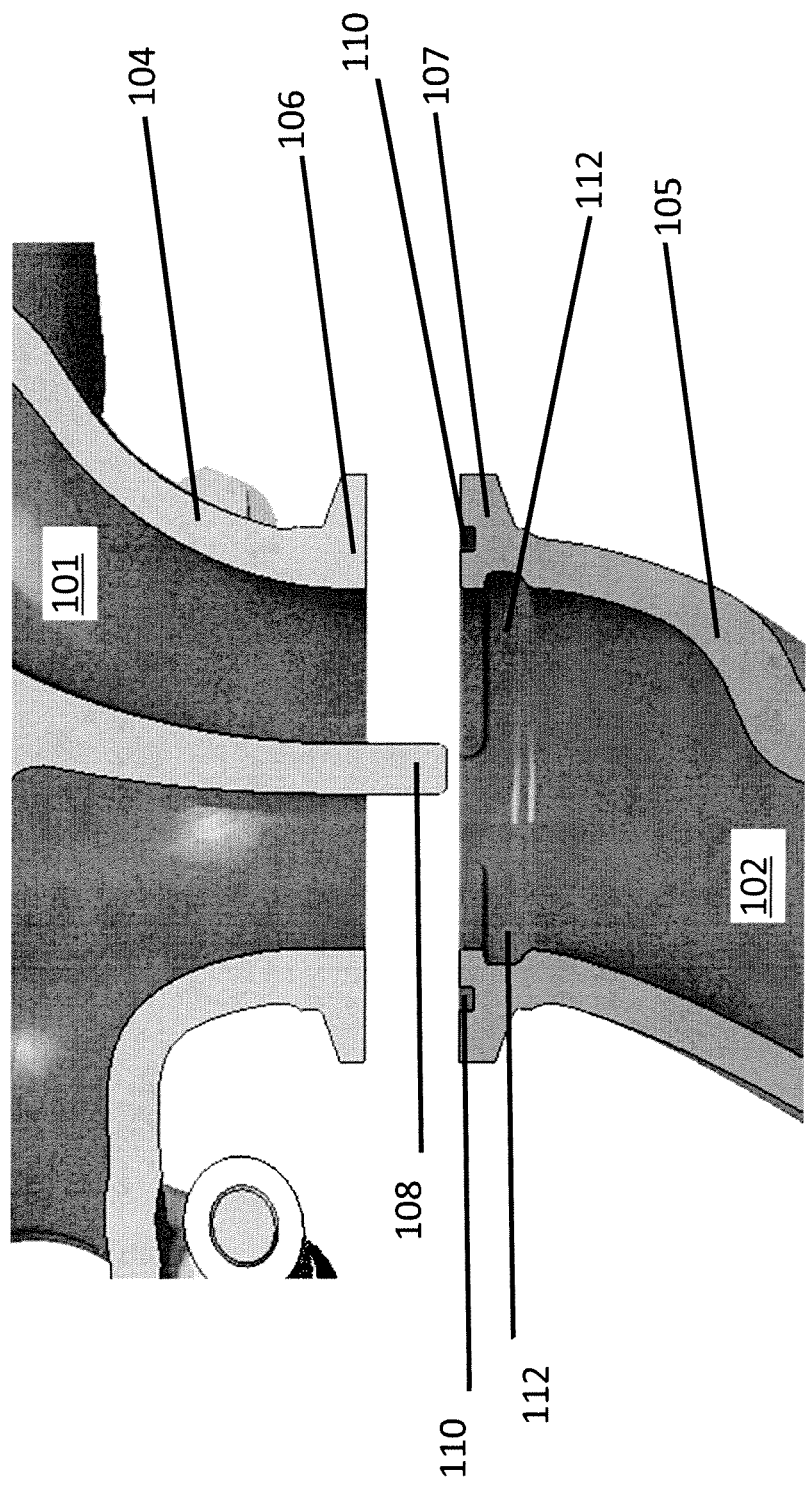
FIG. 7 illustrates a cross sectional view of the turbocharger and exhaust manifold of FIG. 1 separated from one another.

FIG. 7 illustrates a cross sectional view of the turbocharger and exhaust manifold of FIG. 1 separated from one another. As shown in FIG. 7, the extension 108 may extend from the conduit 104 of the exhaust manifold 101. The entry conduit 105 includes channel 112 for receiving an engagement pin, such as the pin 109

Figure 8:
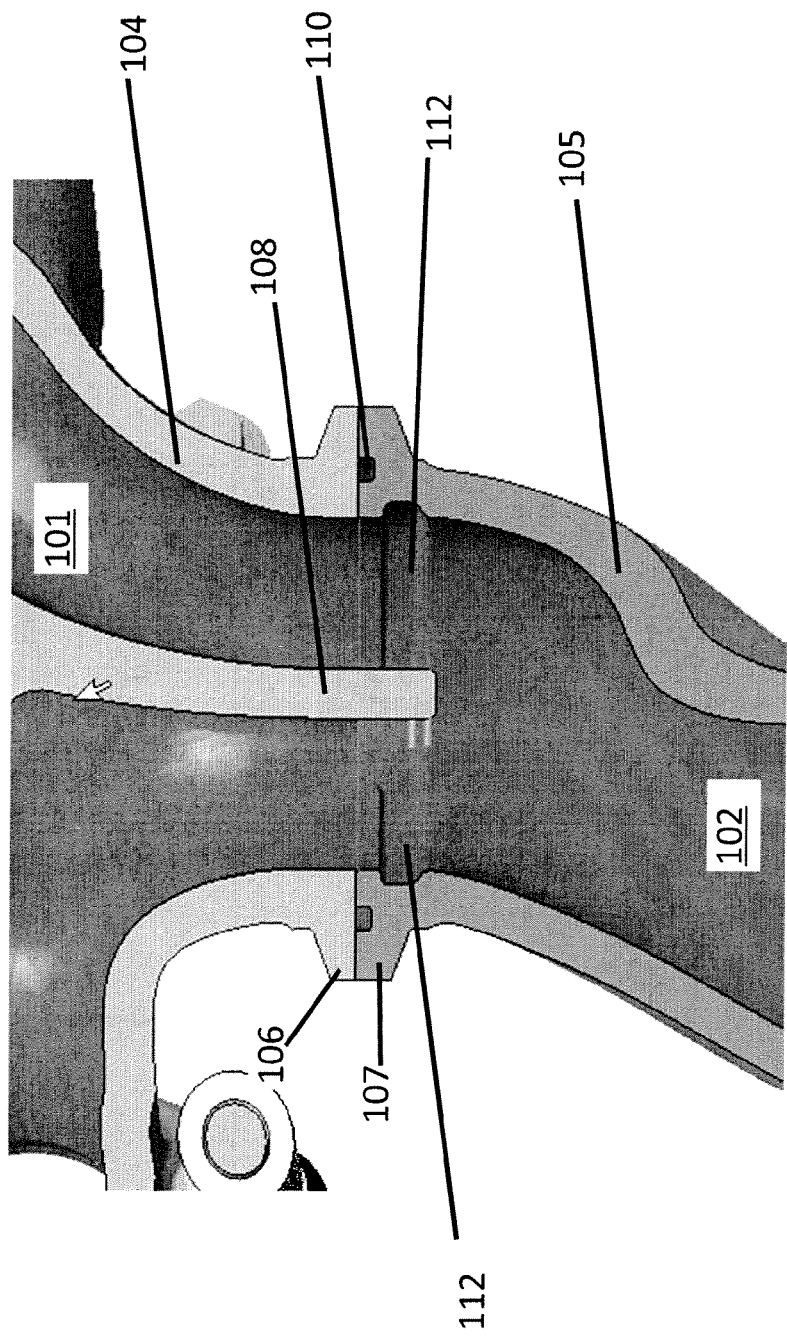
FIG. 8 illustrates a cross sectional view of the turbocharger and exhaust manifold of FIG. 1 engaged with one another.

FIG. 8 illustrates a cross sectional view of the turbocharger and exhaust manifold of FIG. 1 engaged with one another. As shown in FIG. 8, the extension 108 extends into the entry conduit 105 of the turbocharger 102 when the turbocharger 102 is engaged with the exhaust manifold 101 and the exhaust manifold outlet flange 106 and the entry conduit flange 107 of the exhaust manifold 101 and the turbocharger 102, respectively, are positioned in engagement with one another.

Figure 9:
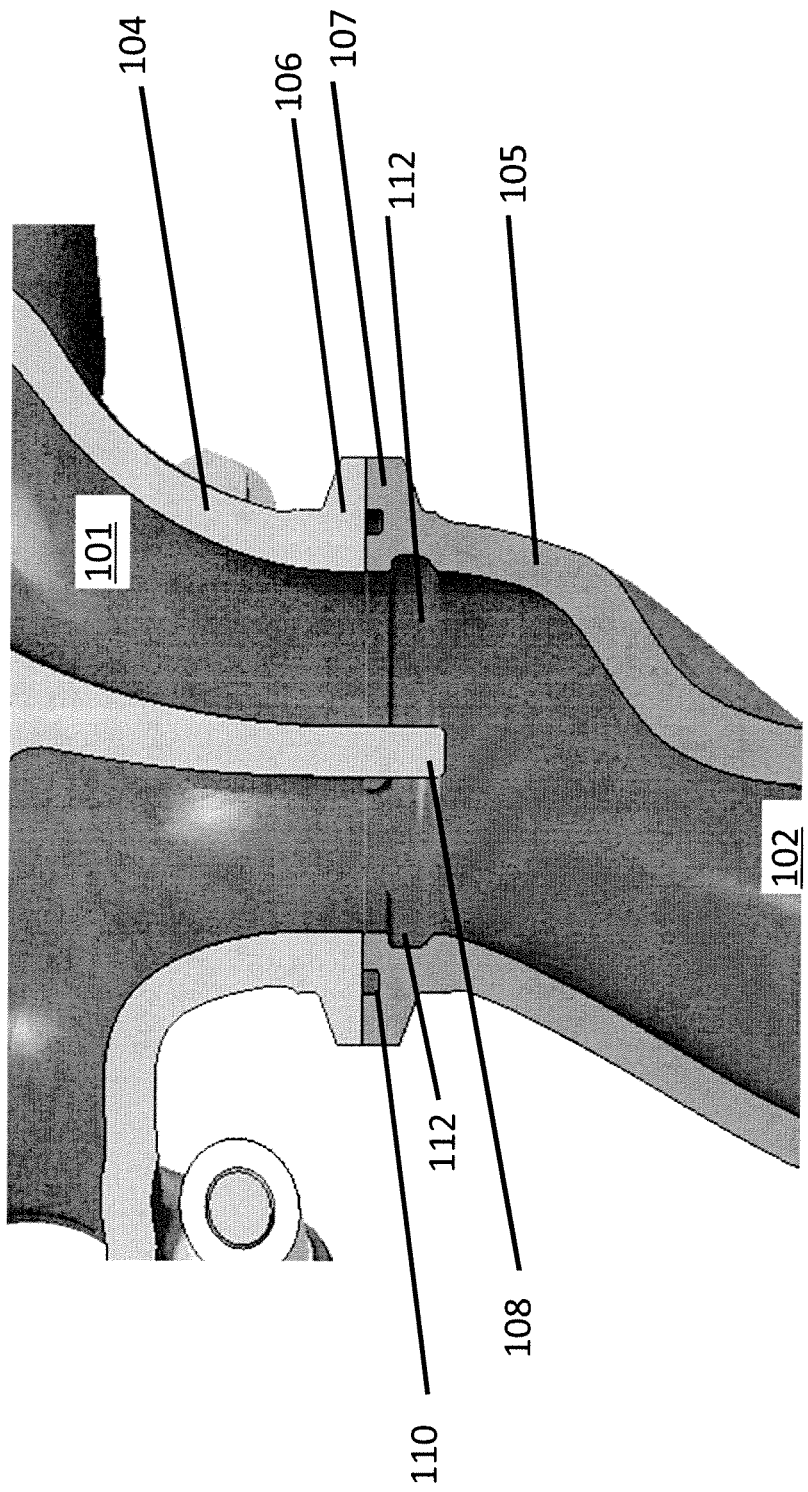
FIG. 9 illustrates a cross sectional view of the turbocharger and exhaust manifold of FIG. 1 engaged with one another at a second position.

FIG. 9 illustrates a cross sectional view of the turbocharger 102 and exhaust manifold of FIG. 1 engaged with one another at a second position. Once the exhaust manifold outlet flange 106 of the exhaust manifold 101 and the entry conduit flange 107 of the turbocharger 102, respectively, are positioned in engagement with one another as shown in FIG. 8, the turbocharger 102 may be rotated with respect to the exhaust manifold 101 from the orientation shown in FIG. 8 to the orientation shown in FIG. 9, such that the pin 109 moves or slides within channel 112. In the illustrated embodiment, channel 112 includes an entry point where the entry conduit is radially wider and configured to receive pin 109. The entry point may be indicated via the alignment indicator 113. Once the turbocharger 102 is rotated with respect to the exhaust manifold 101 and the pin 109 moves within the channel to the final orientation shown in FIG. 9, the turbocharger 102 is supported such that without the lift or support of an operator, the turbocharger 102 will remain engaged with the exhaust manifold without falling pursuant to gravitational forces acting on the turbocharger 102 before a fastener such as the v-band 103 is coupled about the exhaust manifold outlet flange 106 and the entry conduit flange 107. Channel 112 may extend in a longitudinal direction (e.g. axially along the entry conduit 105) and circumferentially about the entry conduit 105, such that moving the pin 109 within the channel requires axial and rotational movement of the pin with respect to the entry conduit 105. Channel 112 may be configured in a helical manner in particular embodiments such that the axial and rotational displacements are achieved substantially simultaneously.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An engine subassembly, comprising:
   an exhaust manifold including an exit conduit, the exit conduit having a first flange disposed about a peripheral portion of the exit conduit;
   a turbocharger including an entry conduit, the entry conduit having a channel formed in a wall thereof, the entry conduit including a second flange disposed about a peripheral portion of the entry conduit, the turbocharger engaged with the exhaust manifold such that the first flange is engaged with the second flange; and
   an extension protruding axially from the exit conduit, the extension including at least one protrusion extending at least in part in a radial direction from the extension, the protrusion configured for engagement with the channel.

2. The engine subassembly of claim 1, wherein the protrusion includes a pin.

3. The engine subassembly of claim 1, further comprising a v-band positioned about the first flange and the second flange.

4. The engine subassembly of claim 1, wherein the channel extends in a longitudinal direction in the entry conduit and in a circumferential direction within the entry conduit, such that the protrusion engages the channel via axial and rotational movement of the protrusion with respect to the entry conduit.

5. The engine subassembly of claim 1, wherein the channel is helical.

6. The engine subassembly of claim 1, further comprising a gasket positioned between the first flange and the second flange.

7. The engine subassembly of claim 1, further comprising an annular O-ring channel disposed in the second flange.

8. The engine subassembly of claim 1, further comprising an O-ring positioned in the O-ring channel.

9. The engine subassembly of claim 1, further comprising a first alignment indicator on the exhaust manifold corresponding to a position of the protrusion and a second alignment indicator on the turbocharger corresponding to an entry point of the channel.

10. The engine subassembly of claim 9, further comprising a third alignment indicator corresponding to a terminus point of the channel.

11. An engine subassembly, comprising:
an exhaust manifold including an exit conduit, the exit conduit having a first flange disposed about a peripheral portion of the exit conduit;
a turbocharger including an entry conduit, the entry conduit including a second flange disposed about a peripheral portion of the entry conduit, the turbocharger engaged with the exhaust manifold such that the first flange is engaged with the second flange; and
an extension coupled to and extending from one of the exit conduit and the entry conduit and extending into the other one of the exit conduit and the entry conduit, the extension including at least one protrusion extending at least in part in a radial direction from the extension, the protrusion configured for engagement with a channel formed in a wall of the other one of the exit conduit and the entry conduit.

12. The engine subassembly of claim 11, wherein the protrusion includes a pin.

13. The engine subassembly of claim 11, further comprising a v-band positioned about the first flange and the second flange.

14. The engine subassembly of claim 11, wherein the extension is coupled to and extends from the exhaust manifold and wherein the channel is formed in a wall of the turbocharger.

15. The engine subassembly of claim 11, wherein the extension is coupled to and extends from the turbocharger and wherein the channel is formed in a wall of the exhaust manifold.

16. An engine subassembly, comprising:
an exhaust manifold including an exit conduit, the exit conduit having a first flange disposed about a peripheral portion of the exit conduit;
a turbocharger including an entry conduit, the entry conduit including a second flange disposed about a peripheral portion of the entry conduit, the turbocharger engaged with the exhaust manifold such that the first flange is engaged with the second flange; and
an extension coupled to and extending from one of the exhaust manifold and the turbocharger and extending into the other one of the exhaust manifold and the turbocharger, the extension including at least one protrusion extending at least in part in a radial direction from the extension, the protrusion configured for engagement with a channel formed in a wall of the other one of the exhaust manifold and the turbocharger,
wherein the protrusion includes a pin.

17. An engine subassembly, comprising:
an exhaust manifold including an exit conduit, the exit conduit having a first flange disposed about a peripheral portion of the exit conduit;
a turbocharger including an entry conduit, the entry conduit including a second flange disposed about a peripheral portion of the entry conduit, the turbocharger engaged with the exhaust manifold such that the first flange is engaged with the second flange;
an extension coupled to and extending from one of the exhaust manifold and the turbocharger and extending into the other one of the exhaust manifold and the turbocharger, the extension including at least one protrusion extending at least in part in a radial direction from the extension, the protrusion configured for engagement with a channel formed in a wall of the other one of the exhaust manifold and the turbocharger; and
a v-band positioned about the first flange and the second flange.

18. A method of assembling an engine subassembly, the method comprising:
engaging a first flange positioned about a peripheral portion of an exit conduit of an exhaust manifold with a second flange positioned about a peripheral portion of an entry conduit of a turbocharger such that a protrusion extending, at least in part, radially outward from an extension coupled to and extending from one of the exit conduit and the entry conduit, and extending into the other one of the exit conduit and the entry conduit, engages a channel formed in a wall of the other one of the exit conduit and the entry conduit; and
rotating the turbocharger with respect to the exhaust manifold, such that the protrusion moves through the channel.

19. The method of claim 18 wherein the protrusion includes a pin.

20. The method of claim 18 further comprising fastening a v-band to the turbocharger and the exhaust manifold about the first flange and the second flange.

21. The method of claim 18 further comprising positioning a gasket between the first flange and the second flange.

22. The method of claim 18 further comprising aligning a first alignment indicator on the exhaust manifold with the a second alignment indicator on the turbocharger, the first alignment indicator corresponding to a position of one of the protrusion and an entry point of the channel and the second alignment indicator corresponding to the other one of the protrusion and an entry point of the channel.

23. The method of claim 22 further comprising rotating the turbocharger with respect to the exhaust manifold until one of the first alignment indicator and the second alignment indicator aligns with a third alignment indicator corresponding to a terminus point of the channel.

24. The method of claim 18 wherein the channel extends in a longitudinal direction in the entry conduit and in a circumferential direction within the entry conduit such that the protrusion engages the channel via axial and rotational movement of the protrusion with respect to the entry conduit.

25. The method of claim 24 wherein the channel is helical.

26. The method of claim 18, wherein one of the first flange and the second flange includes an annular O-ring channel.

27. The method of claim 26, further comprising positioning an O-ring in the annular O-ring channel.

28. A method of assembling an engine subassembly, the method comprising:

engaging a first flange positioned about a peripheral portion of an exit conduit of an exhaust manifold with a second flange positioned about a peripheral portion of an entry conduit of a turbocharger such that a protrusion extending, at least in part, radially outward from an extension coupled to and extending from one of the exhaust manifold and the turbocharger, and extending into the other one of the exhaust manifold and the turbocharger, engages a channel formed in a wall of the other one of the exhaust manifold and the turbocharger; and rotating the turbocharger with respect to the exhaust manifold, such that the protrusion moves through the channel, wherein the protrusion includes a pin.

29. A method of assembling an engine subassembly, the method comprising:

engaging a first flange positioned about a peripheral portion of an exit conduit of an exhaust manifold with a second flange positioned about a peripheral portion of an entry conduit of a turbocharger such that a protrusion extending, at least in part, radially outward from an extension coupled to and extending from one of the exhaust manifold and the turbocharger, and extending into the other one of the exhaust manifold and the turbocharger, engages a channel formed in a wall of the other one of the exhaust manifold and the turbocharger;

rotating the turbocharger with respect to the exhaust manifold, such that the protrusion moves through the channel; and fastening a v-band to the turbocharger and the exhaust manifold about the first flange and the second flange.

30. A method of assembling an engine subassembly, the method comprising:

engaging a first flange positioned about a peripheral portion of an exit conduit of an exhaust manifold with a second flange positioned about a peripheral portion of an entry conduit of a turbocharger such that a protrusion extending, at least in part, radially outward from an extension coupled to and extending from one of the exhaust manifold and the turbocharger, and extending into the other one of the exhaust manifold and the turbocharger, engages a channel formed in a wall of the other one of the exhaust manifold and the turbocharger;

rotating the turbocharger with respect to the exhaust manifold, such that the protrusion moves through the channel; and aligning a first alignment indicator on the exhaust manifold with the a second alignment indicator on the turbocharger, the first alignment indicator corresponding to a position of one of the protrusion and an entry point of the channel and the second alignment indicator corresponding to the other one of the protrusion and an entry point of the channel.

31. The method of claim 30, further comprising rotating the turbocharger with respect to the exhaust manifold until one of the first alignment indicator and the second alignment indicator aligns with a third alignment indicator corresponding to a terminus point of the channel.

32. A method of assembling an engine subassembly, the method comprising:

engaging a first flange positioned about a peripheral portion of an exit conduit of an exhaust manifold with a second flange positioned about a peripheral portion of an entry conduit of a turbocharger such that a protrusion extending, at least in part, radially outward from an extension coupled to and extending from one of the exhaust manifold and the turbocharger, and extending into the other one of the exhaust manifold and the turbocharger, engages a channel formed in a wall of the other one of the exhaust manifold and the turbocharger; and rotating the turbocharger with respect to the exhaust manifold, such that the protrusion moves through the channel, wherein the channel extends in a longitudinal direction in the entry conduit and in a circumferential direction within the entry conduit such that the protrusion engages the channel via axial and rotational movement of the protrusion with respect to the entry conduit.

33. The method of claim 32 wherein the channel is helical.

\* \* \* \* \*